Nov. 19, 1963   W. E. CULBERTSON   3,110,957
BEARING ADJUSTMENT DEVICE
Filed May 12, 1961   2 Sheets-Sheet 1
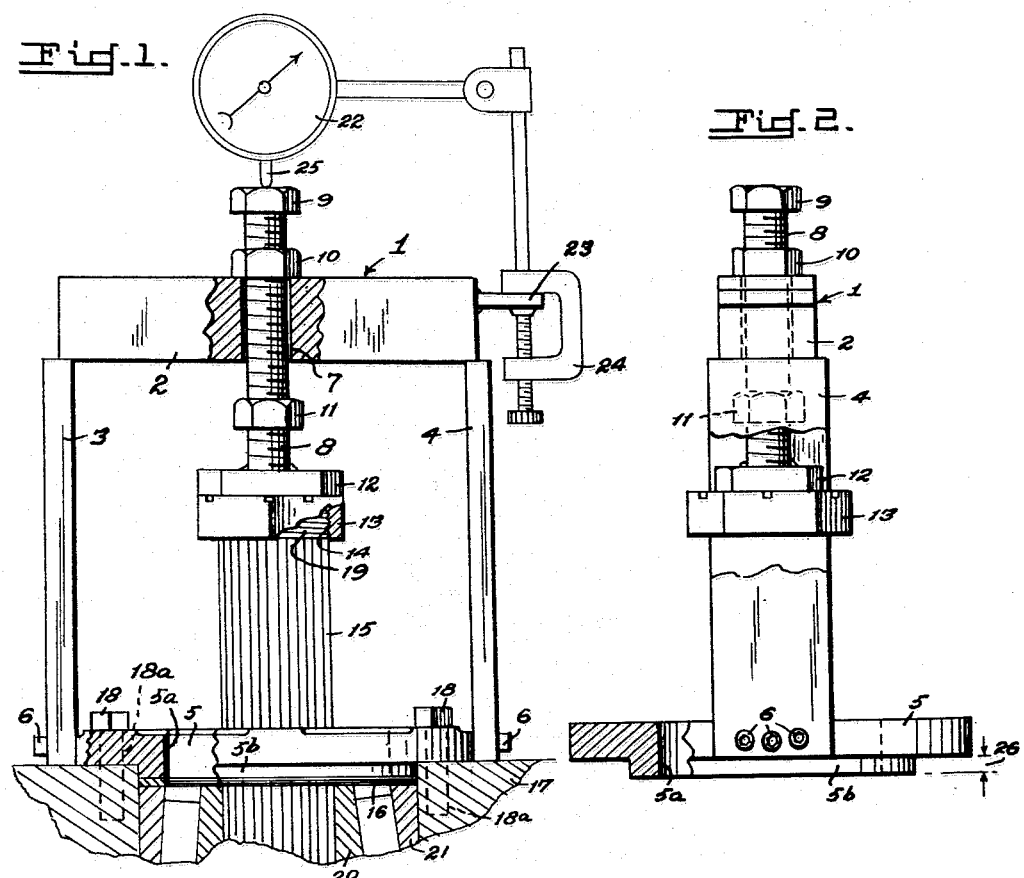
*INVENTOR.*
Warren Culbertson
BY
*S. J. Rotondi & O. J. Dupont*

Nov. 19, 1963 W. E. CULBERTSON 3,110,957
BEARING ADJUSTMENT DEVICE
Filed May 12, 1961 2 Sheets-Sheet 2
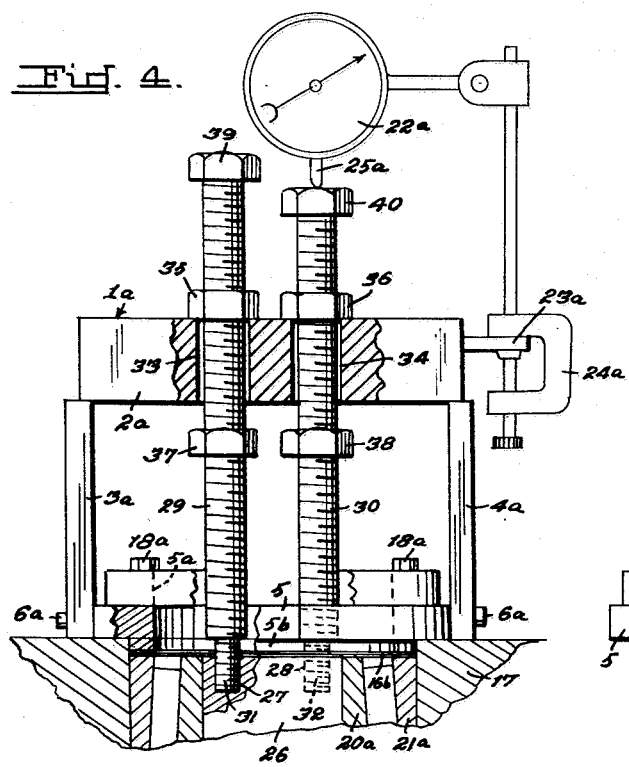
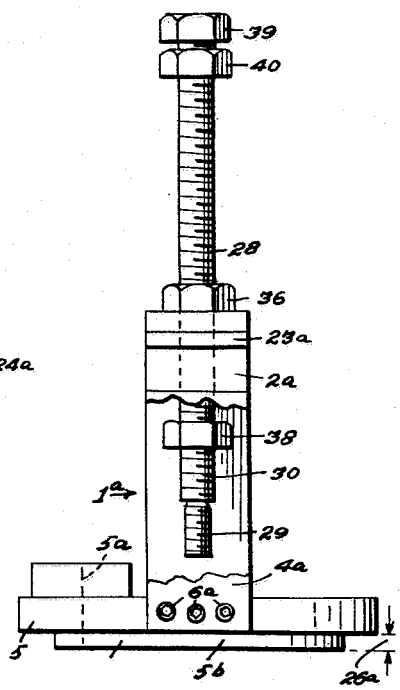
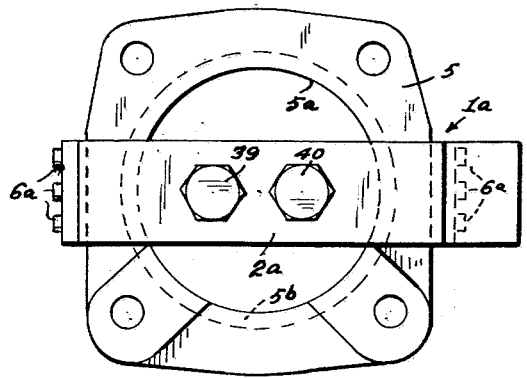
INVENTOR.
Warren Culbertson
BY
S. J. Rotondi & A. J. Dupont – # United States Patent Office 3,110,957
Patented Nov. 19, 1963

3,110,957
BEARING ADJUSTMENT DEVICE
Warren E. Culbertson, McClure, Ohio
Filed May 12, 1961, Ser. No. 109,791
1 Claim. (Cl. 29—260)
(Granted under Title 35, U.S. Code (1952), sec. 266)

The invention described herein may be manufactured and used by or for the Government for governmental purposes without the payment to me of any royalty thereon.

This invention relates to a bearing adjustment device and more particularly to a tool designed to adjust end play in the intermediate and rear output shafts in vehicle gear transfer cases as well as to insure proper seating of the shaft bearing cups.

Previous difficulties have been experienced in the adjustment of end play in gear transfer cases such as:

(a) Failure to fully seat bearing cups in their respective housing prior to the adjustment procedure.

(b) Variance in the strength of different mechanics performing the operation resulting in variable interpretation of a "slight drag" by sense of feel.

(c) Lack of understanding by performing mechanics as to the importance of accurate adjustments.

(d) No provisions for rechecking or re-adjusting shaft end play after assembly of the transfer case.

The present invention is designed to eliminate the aforesaid difficulties by providing a jig having adjusting nuts and bolt or bolts, supported therein which may be readily attached in place of the bearing covers of the intermediate or output shafts whereby the end play may be measured and the bearing cups seated by a simple manipulation of the bolts and adjusting nuts.

It is a primary object of this invention to provide a device for more accurately and positively adjusting the end play of a shaft in a gear transfer case of a vehicle.

It is another object of the invention to provide a device for enabling the operator to adjust end play in a vehicle transfer shaft without removing the transfer case from the vehicle.

It is still another object to provide a means of adjusting the output and intermediate shafts of a gear transfer case that will save time and is simple in construction and operation.

The specific nature of the invention as well as other objects and advantages thereof, will clearly appear from a description of a preferred embodiment such as shown in the accompanying drawings, in which:

FIG. 1 is a side view, partly in section, showing a bearing adjustment device constructed in accordance with the invention and showing it as applied for operation to the rear output shaft of a vehicle gear transfer case and showing a gauge for measuring the end play of the shaft attached thereto;

FIG. 2 is a side view of the device of FIG. 1, showing it separate from the gear transfer case;

FIG. 3 is a top plan view of the device, showing it applied to the rear output shaft of a vehicle gear transfer case;

FIG. 4 is a view similar to FIG. 1 showing a modified form of bearing adjustment device for use in adjusting the end play of the intermediate shaft of a gear transfer case;

FIG. 5 is a side view of the device of FIG. 4 being separated from the transfer case; and FIG. 6 is a top plan view of the device of FIG. 4.

Referring now to the drawings, reference character 1 (FIG. 1) indicates generally a jig which is composed of a bolt guide 2 mounted on guide supports 3 and 4 fastened by welding or the like to the under edge of bolt guide 2. A rear output shaft cover plate 5, having a central opening 5a and an integral annular projection 5b, is attached to the lower ends of guide supports 3 and 4 by socket head bolts 6. Cover plate 5 simulates the regular cover (not shown) with the exception of opening 5a, that is removed from the gear transfer case before the device is to be applied for use as will be described later.

Bolt guide 2 is centrally bored as at 7 to receive a threaded bolt 8. Bolt 8 is of a smaller diameter than bore 7 so that it will be freely slidable therein. Bolt 8 is provided with a hexagonal tool engaging head 9 for application of a wrench or like tool, not shown.

Adjusting nuts 10 and 11 are threadably mounted on either side of guide 2 respectively and a mounting plate 12 is welded to the lower end of bolt 8. A cap nut 13 is welded to the under side of plate 12.

Nut 13 is provided with internal threads 14.

The adjustment of the rear output shaft is accomplished with the device lilustrated in FIGS. 1 to 3 and is as follows:

The cover (not shown) is removed to expose the rear output shaft 15 herein shown as provided with peripheral splines and normally extending beyond transfer case 17. The shim pack 16 is removed also with the cover and is installed beneath the cover 5 as seen in FIG. 1, plus a .030" additional shim.

The device 1 is now secured to the transfer case 17 by the six cap screws 18 which were removed from the original bearing cover (not shown) when it was removed from the transfer case 17. Screws 18 are inserted through holes 18a in plate 5 and are tightened evenly with a torque of 20 to 25 lbs.

Annular projection 5b bears against shim pack 16 resting on bearing cup 21.

Next the cap nut 13 is screwed, by turning bolt 8, onto threads 19 of the shaft 15 until tight.

Only one of the customary roller thrust bearings is illustrated at 20, 21 in FIG. 1. Bearing 20, 21 is designed to absorb endwise thrust on shaft 15 in a direction toward indicator 22. There is a similar thrust bearing adjacent to the opposite end of shaft 15 (not shown), designed to absorb endwise thrust on shaft 15 in a direction away from indicator 22. The inner race of each thrust bearing is secured to shaft 15 by a tight pressed fit as is common in the art, the inner race 20 of the rear bearing being illustrated in FIG. 1. To check end play and adjust the outer bearing races in the transfer case the mechanic tightens nut 10 against member 2 to pull shaft 15 toward indicator 22. The tight friction fit between bearing race 20 and shaft 15 prevents slippage between these parts and thus bearing race 21 is forced tightly against shim pack 16 and portion 5b of plate 5. Nut 10 is loosened and nut 11 is tightened to force shaft 15 away from indicator 22. This seats the bearing race of the thrust bearing at the opposite end of shaft 15, now shown. Nut 11 is loosened.

Now, shaft 15 and bolt 8 are free to float endwise for a few thousandths of an inch, representing undesirable end-play of the shaft which is to be eliminated. The mechanic manually moves the shaft and, for example, finds that the movement is .003 inch as indicated on instrument 22. He records .003, removes the assembly from casing 17 and shim pack 16 is set aside.

Next the shoulder depth 26 of cover 5 is measured by a micrometer (not shown) see FIG. 2.

Also the shoulder depth corresponding to cover 5 is measured on the regular cover (not shown) which was removed.

The shoulder depths are compared with each other and with the .003 endwise shaft movement recorded earlier. Shims are added to or removed from the shim pack as required so that zero end play of shaft 15 will be obtained when the shim pack and regular cover plate are replaced.

In FIGS. 4–6 a modified form of the invention is illustrated and this form is used for checking the end play of the intermediate shaft. This device is constructed similar to the device 1. All parts that are similar to FIGS. 1–3 carry the same reference characters followed by the letter *a*. The intermediate shaft is indicated by 26 and is shown in FIG. 3 exposed (the bearing cover, not shown, being removed). This shaft 26 is provided with two threaded bores 27 instead of threads 19 as on shaft 15, and this shaft does not protrude from the case 17.

There are four cap screws 18*a* instead of six as in the cover 5 for the output shaft 15.

Device 1*a* is provided with threaded bolts 29 and 30 and both bolts are provided with reduced threaded lower portions 31 and 32 adapted to be screwed into threaded holes 27 and 28 respectively of shaft 26.

Bolts 29 and 30 slide through bores 33 and 34 respectively in bolt guide 1*a* and are provided with adjusting nuts 35, 36, 37 and 38. Bolts 29 and 30 are provided with heads 39 and 40.

Neither of the holes 27, 28 in shaft 26 is centered. If only one bolt was used at 29 or 30 the push or pull force would not exert uniform pressure on the thrust bearings to seat them in the case 17. Therefore, two bolts are provided. Simultaneous tightening of nuts 35, 36 draws shaft 26 toward indicator 22*a* to seat bearing race 21*a* with a uniform pressure. Similarly, simultaneous tightening of nuts 37, 38 forces shaft 26 away from indicator 22*a* with a uniform pressure to seat the bearing race (not shown) at the end of shaft 26 opposite from indicator 22*a*. With all nuts loosened (35, 36, 37, 38) the mechanic may grasp bolt 29 and push and pull it to ascertain the end play of shaft 26 as registered by indicator 22*a*.

While the devices shown are for use with the particular type of shafts shown in FIG. 3, they could be used on other shafts of gear cases, etc., by merely unscrewing the cover 5 or 5*a* by bolts 6 or 6*a* and attaching the guide supports 3, 3*a*, 4 and 4*a* to covers similar to the particular type of cover removed.

The device is simple in operation and saves much time in checking the end play of shafts, etc.

Variations and modifications may be effected without departing from the scope of the novel concept of the present invention as set forth in the claim.

What is claimed is:

Bearing adjustment apparatus comprising, a plate adapted for attachment to a shaft opening of a gear case, an annular projection from one side of the plate adapted to enter the shaft opening and contact shims to press the shims against a bearing in the gear case, upstanding supporting guides attached to the plate and carrying a bolt guide at their opposite end, a hole in the bolt guide, a bolt in said hole, means to move the bolt relative to the bolt guide, and attachment means on said bolt adapted to be secured to a shaft having bearing races tightly mounted thereon, the shaft and bearing races being mounted in the gear case whereby the bolt may be adjusted relative to the bolt guide to shift the bolt, shaft and bearing races in one direction or the other to seat bearing races in the gear case, or the bolt may be released for free movement relative to the bolt guide to indicate the amount of endwise movement of the bolt and the attached shaft.

References Cited in the file of this patent

UNITED STATES PATENTS

| | | |
|---|---|---|
| 2,288,906 | Kaplan | July 7, 1942 |
| 2,487,331 | Greene | Nov. 8, 1949 |
| 2,721,377 | Hedlund | Oct. 25, 1955 |